(12) United States Patent
Wang

(10) Patent No.: US 10,409,844 B2
(45) Date of Patent: Sep. 10, 2019

(54) METHOD FOR EXTRACTING MAXIMAL REPEAT PATTERNS AND COMPUTING FREQUENCY DISTRIBUTION TABLES

(71) Applicant: Ching-Tu Wang, Taichung (TW)

(72) Inventor: Ching-Tu Wang, Taichung (TW)

( * ) Notice: Subject to any disclaimer, the term of this patent is extended or adjusted under 35 U.S.C. 154(b) by 590 days.

(21) Appl. No.: 15/208,994

(22) Filed: Jul. 13, 2016

(65) Prior Publication Data

US 2017/0255634 A1 Sep. 7, 2017

Related U.S. Application Data

(60) Provisional application No. 62/301,681, filed on Mar. 1, 2016.

(51) Int. Cl.
| | | |
|---|---|---|
| *G06F 7/00* | (2006.01) | |
| *G06F 17/30* | (2006.01) | |
| *G06F 16/33* | (2019.01) | |

(52) U.S. Cl.
CPC .............................. *G06F 16/3331* (2019.01)

(58) Field of Classification Search
CPC ........... G06F 17/3071; G06F 17/30663; G06F 17/30486
USPC ......................................................... 707/740
See application file for complete search history.

(56) References Cited

U.S. PATENT DOCUMENTS

| 2003/0072289 A1* | 4/2003 | Yuang ................ H04L 12/5601 370/338 |
| 2003/0101166 A1* | 5/2003 | Uchino ................ G06F 16/353 |
| 2005/0050086 A1* | 3/2005 | Liu ....................... G06F 16/435 |
| 2010/0124332 A1* | 5/2010 | Arena ................. H04L 63/0457 380/270 |
| 2011/0218974 A1* | 9/2011 | Amit ....................... G06F 16/00 707/693 |
| 2016/0147640 A1* | 5/2016 | Huang .................... G06F 9/524 717/130 |

OTHER PUBLICATIONS

Wang, Jing-Doo. "External memory approach to compute the maximal repeats across classes from DNA sequences", Asian Journal of Health and Information Sciences, 2006, vol. 1, No. 3, pp. 276-295.
Wang, Jing-Doo. "Extracting Significant Pattern Histories from Timestamped Texts using MapReduce", Journal of Supercomputing, DOI 10.1007/s11227-016-1713-z, ( ) pp. 1-25, Apr. 2016.

* cited by examiner

*Primary Examiner* — Binh V Ho
(74) *Attorney, Agent, or Firm* — McClure, Qualey & Rodack, LLP

(57) ABSTRACT

Pattern discovery in sequential data mining is valuable for many applications, such as genomic signature (biomarker) identification, trend analysis, sequential logs analysis, user action (behavior) analysis and production line analysis. An approach can extract maximal repeat patterns from tagged sequences based on MapReduce programming model, and meanwhile compute the frequency distribution of these patterns according to the tags. Most of all, the components of sequences may be characters, words or records while the types of tags may be timestamps or classes given by users.

8 Claims, 26 Drawing Sheets

$$\left\{\begin{array}{rl} W_{(p,i-1)} & \neq W_{(q,j-1)} \\ W_{(p,i)} & = W_{(q,j)} \\ W_{(p,i+1)} & = W_{(q,j+1)} \\ W_{(p,i+2)} & = W_{(q,j+2)} \\ \vdots & \vdots \\ W_{(p,i+k-1)} & = W_{(q,j+k-1)} \\ W_{(p,i+k)} & \neq W_{(q,j+k)} \end{array}\right\} \quad (1)$$

FIG. 3

| Maximal Repeat Pattern | Sum(T-p,T-q) | |
|---|---|---|
| "$W_{(p,i)}W_{(p,i+1)}\ldots W_{(p,i+k-1)}$" | F(T-p) | F(T-q) |

FIG. 4

(1)   $W_{(p,1)}, W_{(p,2)}, W_{(p,3)}, \ldots, W_{(p,m-1)}, W_{(p,m)}$ ##T-p
(2)   $W_{(p,2)}, W_{(p,3)}, \ldots, W_{(p,m-1)}, W_{(p,m)}$ ##T-p
(3)   $W_{(p,3)}, \ldots, W_{(p,m-1)}, W_{(p,m)}$ ##T-p
.     .        .
.     .        .
.     .        .
(m-1) $W_{(p,m-1)}, W_{(p,m)}$ ##T-p
(m)   $W_{(p,m)}$ ##T-p

FIG. 5

(1)   $W_{(p,m)}, W_{(p,m-1)}, W_{(p,m-2)}, \ldots, W_{(p,2)}, W_{(p,1)}$ ##T-p
(2)   $W_{(p,m-1)}, W_{(p,m-2)}, \ldots, W_{(p,2)}, W_{(p,1)}$ ##T-p
(3)   $W_{(p,m-2)}, \ldots, W_{(p,2)}, W_{(p,1)}$ ##T-p
.     .        .
.     .        .
.     .        .
(m-1) $W_{(p,2)}, W_{(p,1)}$ ##T-p
(m)   $W_{(p,1)}$ ##T-p

FIG. 6

| | | | | | | |
|---|---|---|---|---|---|---|
| 1 | $W_\alpha$ | ##2015-3 | | | | |
| 2 | $W_\alpha$ | ##2015-4 | | | | |
| 3 | $W_\alpha$ | $W_\beta$ | $W_\gamma$ | ##2015-2 | | |
| 4 | $W_\alpha$ | $W_\beta$ | $W_\gamma$ | $W_\eta$ | ##2015-1 | |
| 5 | $W_\alpha$ | $W_\beta$ | $W_\gamma$ | $W_\rho$ | ##2015-1 | |
| 6 | $W_\alpha$ | $W_\beta$ | $W_\gamma$ | $W_\delta$ | $W_\eta$ | $W_\rho$ | ##2015-4 |
| 7 | $W_\alpha$ | $W_\beta$ | $W_\gamma$ | $W_\delta$ | $W_\eta$ | $W_\rho$ | ##2015-4 |
| 8 | $W_\alpha$ | $W_\beta$ | $W_\rho$ | ##2015-3 | | |
| 9 | $W_\alpha$ | $W_\beta$ | ##2015-3 | | | |
| 10 | | ##0000-0 | | | | |

FIG. 10

| | | Frequency Distribution Table | | | |
|---|---|---|---|---|---|
| | | F(2015-1) | F(2015-2) | F(2015-3) | F(2015-4) |
| Candidate Maximal Repeat Pattern | $W_\alpha$ | 2 | 1 | 3 | 3 |
| | $W_\alpha W_\beta$ | 2 | 1 | 2 | 2 |
| | $W_\alpha W_\beta W_\gamma$ | 2 | 1 | 0 | 2 |
| | $W_\alpha W_\beta W_\gamma W_\delta W_\eta W_\rho$ | 0 | 0 | 0 | 2 |

| | | | | | | | output | | $W_aW_bW_yW_\delta W_aW_p$ | 6 | | | | | 2 |
|---|---|---|---|---|---|---|---|---|---|---|---|---|---|---|---|
| 1 | $W_a$ | | | | | | | | | | | | | | |
| 2 | $W_a$ | ##2015-4 | | | | | | | | | | | | | |
| 3 | $W_a$ | $W_y$ | ##2015-2 | | | | | | | | | | | | |
| 4 | $W_a$ | $W_y$ | $W_\delta$ | | | | | | | | | | | | |
| 5 | $W_a$ | $W_y$ | $W_\delta$ | $W_a$ | ##2015-1 | | | | $W_aW_\beta W_y$ | 3 | 2015-2 | | 2 | | 2 |
| 6 | $W_a$ | $W_y$ | $W_\delta$ | $W_a$ | $W_\beta$ | ##2015-1 | | | $W_a$ | 1 | 2015-3 | | | 1 | 1 |
| 7 | $W_a$ | $W_y$ | $W_\delta$ | $W_a$ | $W_\beta$ | $W_\rho$ | ##2015-4 | | NullStr | -1 | | | | | |
| 8 | $W_a$ | $W_y$ | $W_\delta$ | $W_a$ | $W_\beta$ | $W_\rho$ | ##2015-4 | | Candidate Maximal Repeat Pattern | Length | Boundary | | | | |
| 9 | $W_a$ | $W_y$ | $W_\delta$ | $W_a$ | ##2015-3 | | | | | | | F(2015-1) | F(2015-2) | F(2015-3) | F(2015-4) |
| 10 | $W_a$ | $W_y$ | ##0000-0 | | | | | | | | | Frequency Distribution Table | | | |

PatternStack

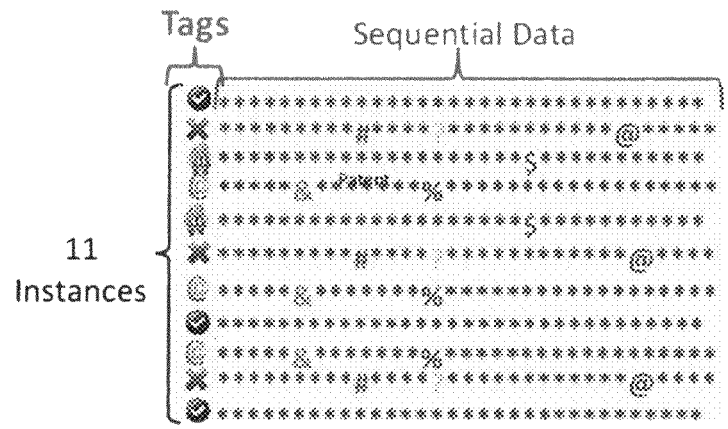
FIG. 20(a)
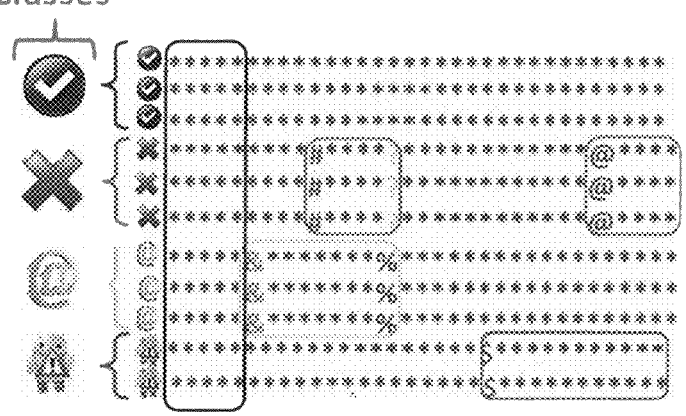
FIG. 20(b)
FIG. 20(c)

(1)   $W_{(p,1)}, W_{(p,2)}, W_{(p,3)}, \cdots, W_{(p,m-1)}, W_{(p,m)}$ ##T-p## $W_0$ (2)   $W_{(p,2)}, W_{(p,3)}, \cdots, W_{(p,m-1)}, W_{(p,m)}$ ##T-p## $W_{(p,1)}$ (3)   $W_{(p,3)}, \cdots, W_{(p,m-1)}, W_{(p,m)}$ ##T-p## $W_{(p,2)}$

| 1  | $W_\alpha$ | ##2015-3 ##$W_\epsilon$ | | | | |
|----|---|---|---|---|---|---|
| 2  | $W_\alpha$ | ##2015-4 ##$W_\epsilon$ | | | | |
| 3  | $W_\alpha$ | $W_\beta$ | $W_\gamma$ | ##2015-2##$W_\epsilon$ | | |
| 4  | $W_\alpha$ | $W_\beta$ | $W_\gamma$ | $W_\eta$ | ##2015-1##$W_\tau$ | |
| 5  | $W_\alpha$ | $W_\beta$ | $W_\gamma$ | $W_\rho$ | ##2015-1##$W_\epsilon$ | |
| 6  | $W_\alpha$ | $W_\beta$ | $W_\gamma$ | $W_\delta$ | $W_\eta$ | $W_\rho$ | ##2015-4 ##$W_\pi$ |
| 7  | $W_\alpha$ | $W_\beta$ | $W_\gamma$ | $W_\delta$ | $W_\eta$ | $W_\rho$ | ##2015-4 ##$W_\pi$ |
| 8  | $W_\alpha$ | $W_\beta$ | $W_\rho$ | ##2015-3##$W_\tau$ | | |
| 9  | $W_\alpha$ | $W_\beta$ | ##2015-3 ##$W_\epsilon$ | | | |
| 10 | | ##0000-0 ##$W_0$ | | | | |

FIG. 22

| Maximal Repeat Pattern | | Frequency Distribution Table | | | | Prefix Word Distribution |
|---|---|---|---|---|---|---|
| | | F(2015-1) | F(2015-2) | F(2015-3) | F(2015-4) | |
| TRUE | $W_\alpha$ | 2 | 1 | 3 | 3 | $W\pi(5)W\pi(2)W\pi(2)$ |
| TRUE | $W_\alpha W_\beta$ | 2 | 1 | 2 | 2 | $W\pi(3)W\pi(2)W\pi(2)$ |
| TRUE | $W_\alpha W_\beta W_\gamma$ | 2 | 1 | 0 | 2 | $W\pi(2)W\pi(1)W\pi(2)$ |
| FALSE | $W_\alpha W_\beta W_\gamma W_\delta W_\alpha W_\beta$ | 0 | 0 | 0 | 2 | $W\pi(2)$ |

FIG. 23

The sequences were adapted from "ftp://ftp.ncbi.nih.gov/genomes/Homo_sapiens/" (Modification Date:2016/6/13)

| | Sequence Filename | GI | The front 50 base pair (bp) of DNA Sequence |
|---|---|---|---|
| 1 | | 568815360 | AGCATTCTCAGAACCTTCTGTGATGCTTGCCTCAACTCACAGTGTG |
| 2 | | 568815361 | GATCCTTGAAGGCGCCCAAGGCATCTCTCAAGTTGGATGTGTGCAT |
| 3 | hs_ref_GRCh38.p7_chr1.fa | 568815362 | GATCCCAATTTGTTACAACATGAAAGCATCATAATCAGGAGCAAGTG |
| 4 | | 568815363 | GATTCATGGCTGAAATGGTGTTGACCAGTATGTGTGTCTCAATCG |
| 5 | | 568815364 | TAACCCTAACCCTAACCCTAACCCTAACCCTAACCCTAACCCTA |
| 6 | | 568815277 | ATCATTGTCAGAAAACTACTTGTGATGTGTGCGTCAACTCACAGGGTT |
| 7 | | 568815278 | AGAATTCTCAGTAACTTCTTTGTGTGTTAGTATTCAACCACAGATTG |
| 8 | hs_ref_GRCh38.p7_chr10.fa | 568815279 | ATCATTCTCAACAACTACTTGTGTGATGTGTGCGTCAACTCACAGATT |
| 9 | | 568815280 | AGAGTTCTCAGTAACTTGTTGTGTGTGTATTCAACTAACAGAGTTG |
| 10 | | 568815281 | CTAACCCTAACCCTAACCCTAACCCTAACCCTAACCCTAACCCT |
| 11 | | 568815271 | GAATTCTTGAAGATTTCTTGGAAACGGGAATATCTTCACAGAAAACT |
| 12 | | 568815272 | AGCATTCTCCGAAACTTCTGTGATGTTGCATTCAACTCACAGGCTGA |
| 13 | hs_ref_GRCh38.p7_chr11.fa | 568815273 | GCATTGTGAGAAACTTCTTGTGATGTTGCATTCAACTCACAGAGTTGA |
| 14 | | 568815274 | AGCATTTCAGAAACTTCTTGTGTGATGTGGCATTCAACTGACAGAGTG |
| 15 | | 568815275 | GAATTCTACATTAGAAAAATAACCATAGCCTCATCACAGGCACTTAAAT |
| 16 | | 568802254 | AGTGTATCAAATCTGTCGTCGTCAAAGGAAGTTTCAATTCTGCTAGTGA |
| 17 | | 568815266 | ACTTCCTTTAGACAGAGCAGATGTCATGTGAGCGTCACGTCACGGAGTT |
| 18 | hs_ref_GRCh38.p7_chr12.fa | 568815267 | ATCATTCTGAGAAACTACTTGTCATGTGAGCGTCAACTCACGGAGTTT |
| 19 | | 568815268 | GTAGTGGTGATGGTGGTTGGTAATGGTGATAGTGGTGATGATGA |
| 20 | | 568815269 | CTAACCCTAACCCTAACCCTAACCCTAACCCTAACCCTAACCCT |

FIG. 25

|    | ClassID | Hypothesis Markers |
|----|---------|--------------------|
| 1  | C1      | AAAACCCCGGGGTTTT   |
| 2  | C1      | AAAACCCCGGGGTTTT   |
| 3  | C1      | AAAACCCCGGGGTTTT   |
| 4  | C1      | AAAACCCCGGGGTTTT   |
| 5  | C1      | AAAACCCCGGGGTTTT   |
| 6  | C2      | ACGTACGTACGT       |
| 7  | C2      | ACGTACGTACGT       |
| 8  | C2      | ACGTACGTACGT       |
| 9  | C2      | ACGTACGTACGT       |
| 10 | C2      | ACGTACGTACGT       |
| 11 | C3      | TCGATCGATCGATCGA   |
| 12 | C3      | TCGATCGATCGATCGA   |
| 13 | C3      | TCGATCGATCGATCGA   |
| 14 | C3      | TCGATCGATCGATCGA   |
| 15 | C3      | TCGATCGATCGATCGA   |
| 16 | C4      | AAAAACCCCCGGGGGTTTTT |
| 17 | C4      | AAAAACCCCCGGGGGTTTTT |
| 18 | C4      | AAAAACCCCCGGGGGTTTTT |
| 19 | C4      | AAAAACCCCCGGGGGTTTTT |
| 20 | C4      | AAAAACCCCCGGGGGTTTTT |

FIG. 26

| ClassID | GI | Hypothesis Marker inserted within the front 50 bp of DNA Sequence |
|---|---|---|
| 1 | C1 | 568815360 | AGCATTCTCAGAACCTTCTTGAAAACCCCGGGTTTTGATGCTTGCCTTCAACTCACAGTGTG |
| 2 | C1 | 568815361 | GATCCTTGAAGCGCCCCAAAACCCCGGGGTTTTAAGGGCATCTTCTCAAAGTTGGATGTGTGCAT |
| 3 | C1 | 568815362 | GATCCCAATTTGTTACAACATCGAAAGCAAAACCCCGGGGTTTTCATAATCAGGAGCAAGTCG |
| 4 | C1 | 568815363 | GATTCATGGCTGAAAACCCCGGGGTTTTAAATGTGTTGACCAGCAGTATGTGTGTCTCAATCG |
| 5 | C1 | 568815364 | TAACCCTAACCCTAACCCTAAACCCCGGGGTTTTAACCCTAACCCTA |
| 6 | C2 | 568815277 | ATCATTGTCACGTACGTACGTAGAAACTACTTGTGATGTGCGTTCAACTCACAGGTTT |
| 7 | C2 | 568815278 | AGAATTCTCAGTAAACGTACGTACGTACGTCTCTTCTTGTGTTGTAGTATTCAACCACAGATTG |
| 8 | C2 | 568815279 | ATCATTCTCAACAACTACTTACGTACGTACGTGATGTGCGTTCAACTCACAGAGTTT |
| 9 | C2 | 568815280 | AGAGTTCTCAGTACGTACGTACGTAACTGTTGTGTTGTGTTATCAACTAACAGAGTTG |
| 10 | C2 | 568815281 | CTAACCCTAACCCTAACCCTAACCGTACGTAACCCTAACCCTAACCCTAACCCT |
| 11 | C3 | 568815271 | GAATTCTTGAAGATTTCTTGAAACGGAATATCTTCATCGATCGATCGATCGACAGAAAAACT |
| 12 | C3 | 568815272 | AGCATTCTCCGAAACTTCTTGTGATGTTTCGATCGATCGATCGATCGAGCATTCAACTCACAGGCTGA |
| 13 | C3 | 568815273 | GCATTGTGAGAAACTTCTTGTGATGTTTCGATCGATCGATCGATCGATCGAAACTCACAGAGTTGA |
| 14 | C3 | 568815274 | AGCATTTTCAGAAACTTCTTGTGATGATGTTCGATCGATCGATCGATCGAGCATTCAACTGACAGAGTTG |
| 15 | C3 | 568815275 | GAATTCTACATTGAAAAATAAACTCGATCGATCGATCGACATAGCCTCATCACAGGCACTTAAAT |
| 16 | C4 | 568802254 | AGTGAAAAACCCCGGGGTTTTATCAAATCGCTCTGTCAAAGGAAGTTTCAATTCTGCTAGTTGA |
| 17 | C4 | 568815266 | ACTTCCTTAGACAGAGCAGATGTAAACACCCTTTTAAAACCCCGGGGGTTTTTGAGGAATTGA |
| 18 | C4 | 568815267 | ATCATTCTGAGAACTTGTCAGTGAAAAACCCCGGGGTTTTGCGTTCAACTCACGAGTTT |
| 19 | C4 | 568815268 | GTAGTGGTGATGGTGGTAATGGTGATAGTGAAACCCCGGGGGTTTTTGTGATGGTGGTGATGGA |
| 20 | C4 | 568815269 | CTAACCCTAACCCTAACCAAAACCCCGGGGTTTTCTAACCCTAACCTAACCCTAACCCT |

FIG. 27

| | Maximal Repeat Patterns | Length | Class Frequency Distribution (ClassID#df#tf) |
|---|---|---|---|
| 1 | AAAAACCCCCGGGGGTTTTT | 20 | (C4#5#5) |
| 2 | AAAACCCCCGGGGGTTTTTG | 21 | (C4#3#3) |
| 3 | AAAACCCCGGGGTTTT | 16 | (C1#5#5) |
| 4 | AAAACCCCGGGGTTTTAA | 18 | (C1#3#3) |
| 5 | AAAACCCCGGGGTTTTT | 17 | (C1#2#2) |
| 6 | AACTCACAGAGTT | 13 | (C2#1#1)(C3#1#1) |
| 7 | ACGTACGTACGT | 12 | (C2#5#5) |
| 8 | ACGTACGTACGTA | 13 | (C2#3#3) |
| 9 | AGAAACTACTTTGT | 14 | (C2#1#1)(C4#1#1) |
| 10 | AGAAACTTCTTTGTGATGT | 19 | (C3#2#2) |
| 11 | AGTGAAAACCCCCGGGGGTTTTT | 24 | (C4#2#2) |
| 12 | ATCGATCGATCGA | 13 | (C3#5#6) |
| 13 | CTAACCCTAACC | 12 | (C1#1#4)(C2#1#5)(C4#1#6) |
| 14 | CTAACCCTAACCCT | 14 | (C1#1#4)(C2#1#5)(C4#1#5) |
| 15 | CTAACCCTAACCCTA | 15 | (C1#1#4)(C2#1#4)(C4#1#4) |
| 16 | CTAACCCTAACCCTAA | 16 | (C1#1#4)(C2#1#3)(C4#1#4) |
| 17 | CTAACCCTAACCCTAACC | 18 | (C1#1#3)(C2#1#3)(C4#1#4) |
| 18 | CTAACCCTAACCCTAACCCT | 20 | (C1#1#3)(C2#1#3)(C4#1#3) |
| 19 | CTAACCCTAACCCTAACCCTAA | 22 | (C1#1#3)(C2#1#2)(C4#1#2) |
| 20 | CTAACCCTAACCCTAACCCTAACCCT | 26 | (C1#1#2)(C2#1#2)(C4#1#2) |
| 21 | CTAACCCTAACCCTAACCCTAACCCTAA | 28 | (C1#1#2)(C2#1#1)(C4#1#1) |
| 22 | CTAACCCTAACCCTAACCCTAACCCTAACCCT | 32 | (C1#1#1)(C2#1#1)(C4#1#1) |
| 23 | CTCGATCGATCGA | 17 | (C3#2#2) |
| 24 | CTTTGTGATGTGT | 13 | (C2#1#1)(C3#1#1) |
| 25 | GAAAACCCCGGGGTTTT | 17 | (C1#2#2) |
| 26 | GAAACTTCTTTGTGATGT | 18 | (C3#3#3) |
| 27 | GAAACTTCTTTGTGATGTTT | 20 | (C3#2#2) |
| 28 | TAACCCTAACCCT | 13 | (C1#1#6)(C2#1#6)(C4#1#5) |
| 29 | TAACCCTAACCCTA | 14 | (C1#1#6)(C2#1#5)(C4#1#4) |
| 30 | TAACCCTAACCCTAA | 15 | (C1#1#5)(C2#1#4)(C4#1#4) |
| 31 | TAACCCTAACCCTAACC | 17 | (C1#1#4)(C2#1#4)(C4#1#4) |
| 32 | TAACCCTAACCCTAACCCT | 19 | (C1#1#4)(C2#1#4)(C4#1#3) |
| 33 | TAACCCTAACCCTAACCCTAA | 21 | (C1#1#4)(C2#1#3)(C4#1#2) |
| 34 | TAACCCTAACCCTAACCCTAACCCT | 25 | (C1#1#3)(C2#1#3)(C4#1#2) |
| 35 | TAACCCTAACCCTAACCCTAACCCTAA | 27 | (C1#1#3)(C2#1#2)(C4#1#1) |
| 36 | TAACCCTAACCCTAACCCTAACCCTAACCCT | 31 | (C1#1#2)(C2#1#2)(C4#1#1) |
| 37 | TAACCCTAACCCTAACCCTAACCCTAACCCTAA | 33 | (C1#1#2)(C2#1#1) |
| 38 | TAACCCTAACCCTAACCCTAACCCTAACCCTAACCCT | 37 | (C1#1#1)(C2#1#1) |
| 39 | TACGTACGTACGT | 13 | (C2#3#3) |
| 40 | TACGTACGTACGTAAC | 16 | (C2#2#2) |
| 41 | TCGATCGATCGA | 12 | (C3#5#10) |
| 42 | TCGATCGATCGATCGA | 16 | (C3#5#5) |
| 43 | TCGATCGATCGATCGACA | 18 | (C3#2#2) |
| 44 | TGCGTTCAACTCAC | 14 | (C2#2#2)(C4#1#1) |
| 45 | TGTGATGTGTGCGTTCAACTCACAG | 25 | (C2#2#2) |
| 46 | TTCAACTCACAG | 12 | (C1#1#1)(C2#2#2)(C3#1#1) |
| 47 | TTCAACTCACAGG | 13 | (C2#1#1)(C3#1#1) |
| 48 | TTCGATCGATCGATCGAGCATTCAACT | 27 | (C3#2#2) |

FIG. 28

METHOD FOR EXTRACTING MAXIMAL REPEAT PATTERNS AND COMPUTING FREQUENCY DISTRIBUTION TABLES

BACKGROUND OF THE INVENTION

Field of the Invention

This invention relates to sequential data mining, and more particularly, to an approach for extracting maximal repeat patterns and computing their frequency distribution from a huge amount of tagged sequences with a MapReduce framework.

Description of the Prior Art

The frequency distribution of repeat patterns plays an important role in many practical applications such as, for example, genomic pattern (biomarker) mining in bioinformatics, trend analysis in text mining, events (logs) analysis in internet security, user behavior analysis and production line analysis. Suffix tree and suffix array are two well-known data structures for extracting maximal repeats from sequences. However, the computation based on above two data structures suffers from memory limitation problem, especially when the volume of sequences exceeds the size of main memory available in one computing node. To overcome that memory limitation problem, the String B-Tree (SB-Tree), based on an external memory-based approach, was proposed and supposed to be able to handle larger amount of sequences. However, the computation via SB-Tree is time-consuming because the speed of external memory (e.g. disk) input/output is slow. It is desired to improve the computation of repeat pattern extraction via multi-computing nodes, especially with a MapReduce framework that is expected to be scalable.

SUMMARY OF THE INVENTION

In view of this, an embodiment of the present invention provides a method for extracting maximal repeat patterns and computing frequency distribution tables. The method is executed in a computing system across multiple nodes of a cluster of machines. The maximal repeat patterns are extracted from sequences attached with tags, and the frequency distribution tables of candidate patterns are computed according to classes or categories derived from the tags. The method comprises splitting the sequences into partitions such that each partition receives uniform load; assigning each of the partitions to a map task that is run on a worker node; generating suffixes of the sequences in the same partition by each of the map tasks, wherein each of the suffixes is attached with one tag belonging to a corresponding sequence; partitioning the suffixes into groups, wherein each of the groups contains the suffixes whose first k components are the same (e.g. k=1); sorting the suffixes within one group; assigning each of the groups to a reducer that is run on the worker node; allowing each of the reducers to scan the sorted suffixes in the same group and to extract a longest common prefix of two successive suffixes as one candidate maximal repeat pattern for each of the reducers; and computing a frequency distribution of the candidate maximal repeat pattern according to the classes or the categories derived from the tags via a stack with push/pop operations.

Wherein, the tags comprise at least one of timestamps, classes, or categories.

Wherein, each of the sequences is a sequential data, and the sequential data comprises at least one of characters, words, or records.

Wherein, the candidate maximal repeat patterns are extracted from original sequences if these patterns are satisfied with right boundary verification and from the reverse of the sequences if these patterns are satisfied with left boundary verification.

Wherein, a maximal repeat is a repeat which is unable to be extended to the left or right to a longer repeat, and a maximal repeat pattern is a repeat pattern if the maximal repeat pattern is satisfied with right boundary verification and the reverse of the maximal repeat pattern is satisfied with left boundary verification at the same time.

Wherein, the step of sorting the suffixes within one group includes sorting the suffixes with the same key collected from all of the partitions.

Wherein, the reducer executes the step of scanning the sorted suffixes, extracting the candidate maximal repeat patterns, and computing the frequency distributions.

Wherein, the process of generating suffixes of the sequences is modified as the process of generating the fixed length p prefixes of suffixes of the sequences; the maximal length of candidate maximal repeat patterns extracted is limited to the value of p.

Wherein, the computing system across multiple nodes of a cluster of machines comprises hardware components having worker nodes for running map tasks and reduce tasks, and wherein the worker nodes can be general purpose computers.

Wherein, the right and left boundary verification of one candidate maximal repeat pattern can be done simultaneously if each of suffixes is attached not only with its tag but also with one or more prefix character, word, or record that is just ahead of that suffix in original sequence when generating suffixes; one candidate maximal repeat pattern is esteemed as not a maximal repeat pattern if all of the prefix characters, words, or records just appearing ahead of that pattern in original sequences are the same.

BRIEF DESCRIPTION OF THE DRAWINGS

FIG. 3 shows the Equation (1) for defining the maximal repeat pattern in FIG. 2.

FIG. 4 gives the frequency distribution of pattern "$W_{(p,i)}W_{(p,i+1)}W_{(p,i+2)} \ldots W_{(p,i+k-1)}$" according to $S_p$ and $S_q$ in FIG. 2.

FIG. 5 shows the suffixes of sequence $S_p$ and each of suffixes is with a tag "T-p".

FIG. 6 shows the suffixes of reversed sequence $S_p$ and each of suffixes is with a tag "T-p".

FIG. 10 gives an example of 9 sorted suffixes.

FIG. 11 gives the frequency distribution tables of 5 candidate maximal repeat patterns extracted from the 9 sorted suffixes in FIG. 10.

FIG. 12, FIG. 13, FIG. 14, FIG. 15, FIG. 16, FIG. 17 and FIG. 18 show the temporary content of the "PatternStack" while scanning the sorted suffixes one by one as shown in FIG. 10 and meanwhile extract corresponding candidate maximal repeats as output as shown in FIG. 11.

FIGS. 20(a), 20(b) and 20(c) collectively illustrate an example to show the concept of this invent, where FIG. 20(a) shows 11 instances of sequential data with tags (small icons), and FIG. 20(b) shows that there are four classes (large icons) derived from the tags (small icons) and six maximal repeat patterns, for example, are marked with rectangles. The frequency distribution table of those maximal repeat patterns according to that four classes is shown in FIG. 20(c).

FIG. 21, similar to FIG. 5, shows the suffixes of sequence $S_p$, but each of suffixes is with one more prefix word just ahead of that suffix in sequence $S_p$, where the "$W_0$" presents an empty symbol because there is no prefix word ahead of the first suffix.

FIG. 22 is similar to FIG. 10, but each of sorted suffixes is with one more prefix word just ahead of that suffix in its original sequence.

FIG. 23 is similar to FIG. 11, but can tell whether or not one pattern with Right Boundary Verification is maximal repeat without further Left Boundary verification process.

FIG. 25 shows a table that contains 20 deoxyribonucleic acid (DNA) sequences extracted from the front 50 base pair (bp) of 20 DNA sequences, belong to four sequence filenames of human genomes, according to GenInfo Identifier (GI) number in National Center for Biotechnology Information (NCBI).

FIG. 26 gives four types of Class Identifiers (ClassID) and the corresponding "Hypothesis Markers" individually for each of 20 DNA sequences in FIG. 25.

FIG. 27 shows the table that contains 20 DNA sequences in FIG. 25 after being inserted with corresponding "Hypothesis Markers" in FIG. 26, where the inserting locations are determined manually but without purpose.

FIG. 28 gives the table that contain the statistics of maximal repeat patterns, extracted from DNA sequences in FIG. 27, whose lengths are greater than 12.

DETAILED DESCRIPTION OF THE PREFERRED EMBODIMENTS

Figure 1:
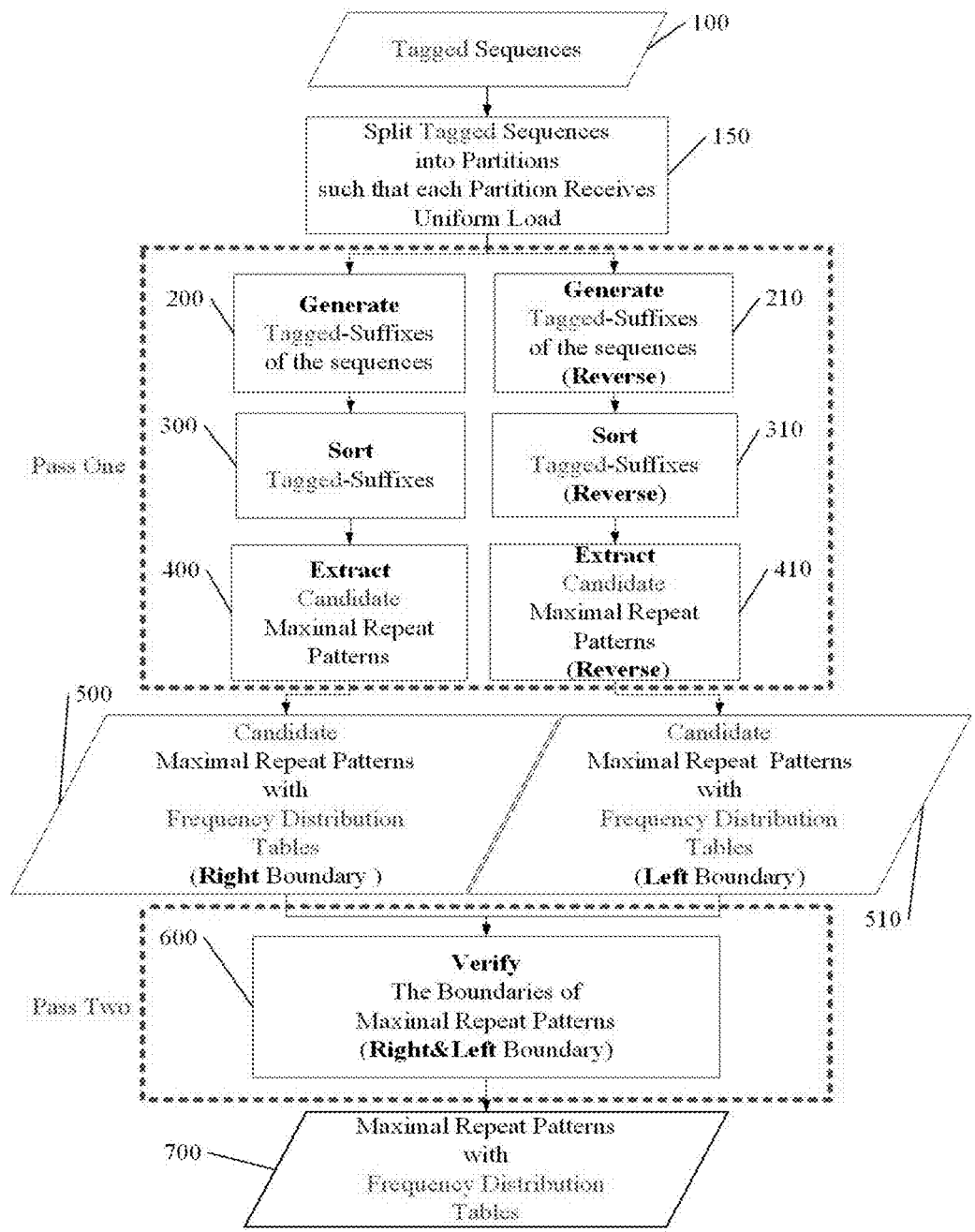
FIG. 1 is the flowchart of maximal repeat extraction where the two dashed rectangles represent two passes of MapReduce processes.

FIG. 1 shows the flowchart of extracting maximal repeat patterns from tagged sequences 100, and meanwhile the frequency distribution of each pattern extracted is computed with the list of tags derived from those sequences comprising that pattern. The tags attached with each of sequences are specified by domain experts or observers according to what kind of information they desire. Most of all, the computation of above processes base on the MapReduce programming model.

First, the input of tagged sequences 100 are split into partitions in step 150 such that each partition receives uniform load. The top dashed rectangle in FIG. 1, named as "Pass One", comprises two independent pipelines 200→300→400 (or 210→310→410) for extracting candidate maximal repeat patterns with right (or left) boundary verification, and meanwhile computing frequency distribution tables 500 (or 510) of these candidate patterns. In step 600, the bottom dashed rectangle in FIG. 1, named as "Pass Two", takes the two outputted frequency distribution tables 500 and 510 produced independently by "Pass One" as its input, and then identifies one pattern as a maximal repeat pattern 700 if that pattern exists in the set of candidate repeat patterns with right boundary verification, and its reverse found in the set of those patterns with left boundary verification. The details of the definitions and processes used in the description are given in the following.

Figure 2:
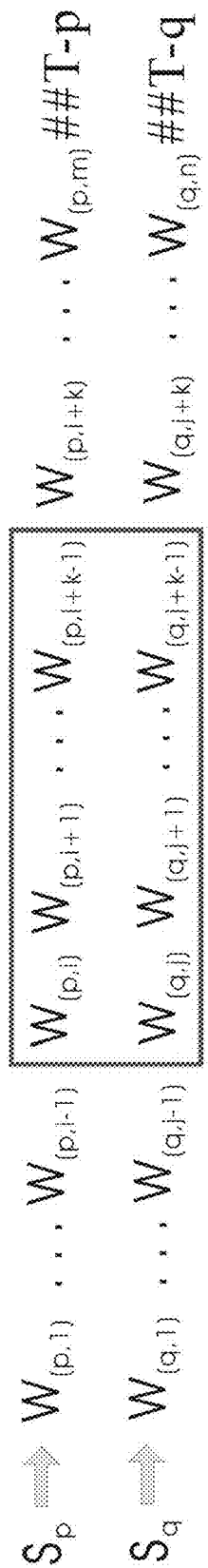
FIG. 2 gives an example "$W_{(p,i)}W_{(p,i+1)}W_{(p,i+2)} \ldots W_{(p,i+k-1)}$" of one maximal repeat pattern within two sequences, $S_p$ and $S_q$, with two Tags, T-p and T-q, respectively.

Let Sp (resp. Sq) be the p-th (resp. q-th) sequence and comprises m (resp. n) consecutive symbols as "$W_{(p,i)} W_{(p,2)} W_{(p,3)} \ldots W_{(p,m)}$" (resp. "$W_{(q,i)} W_{(q,2)} W_{(q,3)} \ldots W_{(q,n)}$") in which the type of these symbols may be character, word or record; the marker "##" is for separating the sequence and its own tag as shown in FIG. 2; the pattern comprising the k consecutive symbols "$W_{(p,i)} W_{(p,i+1)} W_{(p,i+2)} \ldots W_{(p,i+k-1)}$" is considered to be a maximal repeat pattern if Eq.(1) holds as shown in FIG. 3; the frequency distribution of that pattern comprises the values computed by function "F" that use the tags in "Sum(TagsList)" as shown in FIG. 4. FIG. 5 illustrates the suffixes derived from sequence Sp and FIG. 6 gives the suffixes derived from the reverse of sequence Sp. The former in FIG. 5 is used for right boundary verification while the latter in FIG. 6 is used for left boundary verification.

The top dashed rectangle "Pass One" in FIG. 1 comprises two independent pipelines 200→300→400 (or 210→310→410) for extracting candidate maximal repeat patterns via a MapReduce programming model, and meanwhile computing the frequency distribution table 500 (or 510) of these extracted patterns according to the tags that are collected from the sequences that contain the corresponding patterns.

First, the input sequences are divided into several partitions in step 150 such that each partition receives uniform load, and then each of partitions is assigned to a map task that is run at a worker node for further processes of two independent pipelines; for the right boundary verification in one pipeline 200→300→400, the map task of "Pass One" generates the suffixes of all sequences in the same partition in step 200 and each of these suffixes is attached with one tag derived from its original sequence as shown in FIG. 5. Similarly, for the left boundary verification in another pipeline 210→310→410, the map task of "Pass One" generates the suffixes in step 210 of all sequences reversed as shown in FIG. 6.

Secondly, in step 300 (or 310), in order to have "secondary sort" that have the values suffixes with the same "key" received by the reducer are sorted, the map task write output in the format <"key pair", Null> to the reducer. The "key pair" comprises two items, "key" and "value", where the "key" is the first k components of one suffix and the "value" is one suffix with its tag; for simplicity, the first component "W" (k=1) of each suffix is selected as the "key" in the following description.

Thirdly, the suffixes with the same "key" are sorted in lexicographic order and are sent to one of the reducers for further processes of extracting candidate maximal repeat patterns. In steps 400 (or 410), the procedure of extracting candidate maximal repeat patterns for each reducer belonging to the "Pass One" in FIG. 1 is to scan the sorted suffixes one by one, and then compute the longest common prefix (lcp) between two successive suffixes as one candidate maximal repeat pattern; the frequency distribution table 500 (or 510) of these candidate patterns can be obtained and accumulated using push/pop operations via a stack while scanning these sorted suffixes. Note that each of candidate maximal repeat patterns is attached with one of two values, "1" or "−1", as a marker to show that pattern passing right or left boundary verification. To have this description more self-contained, an example to illustrate the processes of extracting candidate maximal repeat patterns is given in the last part of this description.

In step 600 of FIG. 1, the bottom dashed rectangle "Pass Two" is for maximal repeat pattern verification. A pattern is defined as a maximal repeat pattern if that pattern passes both right and left boundary verification. The map task reads the input that comprises two outputs 500 and 510 in "Pass One", and writes the output <"key", "value"> in the format as the suffix tagged with Sum (TagsList) as the "key" to the reducer without modification if the corresponding value is "1", but writes the output by having the suffix reversed if the original value is "−1". That is, each of those patterns 700 passing both right and left boundary verification will be sent to the same reducer and therefore the summation of two values is expected to be "0". Note that the usage of that two values defined as "1" or "4" is only for simplicity and can be replaced by another values for the same purpose, embodiments are not limited thereto.

Figure 7:
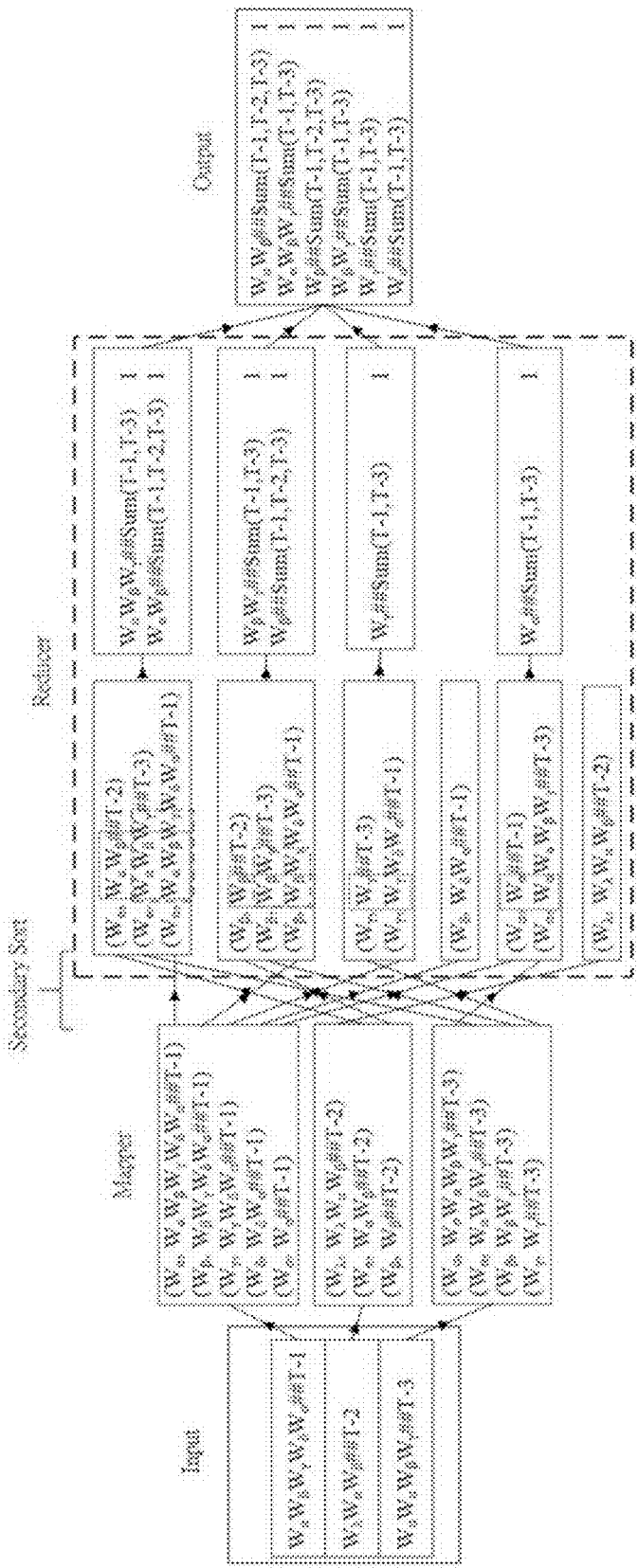
FIG. 7 is an example of MapReduce data flow for Right Boundary Verification of maximal repeat pattern in Pass One.
Figure 8:
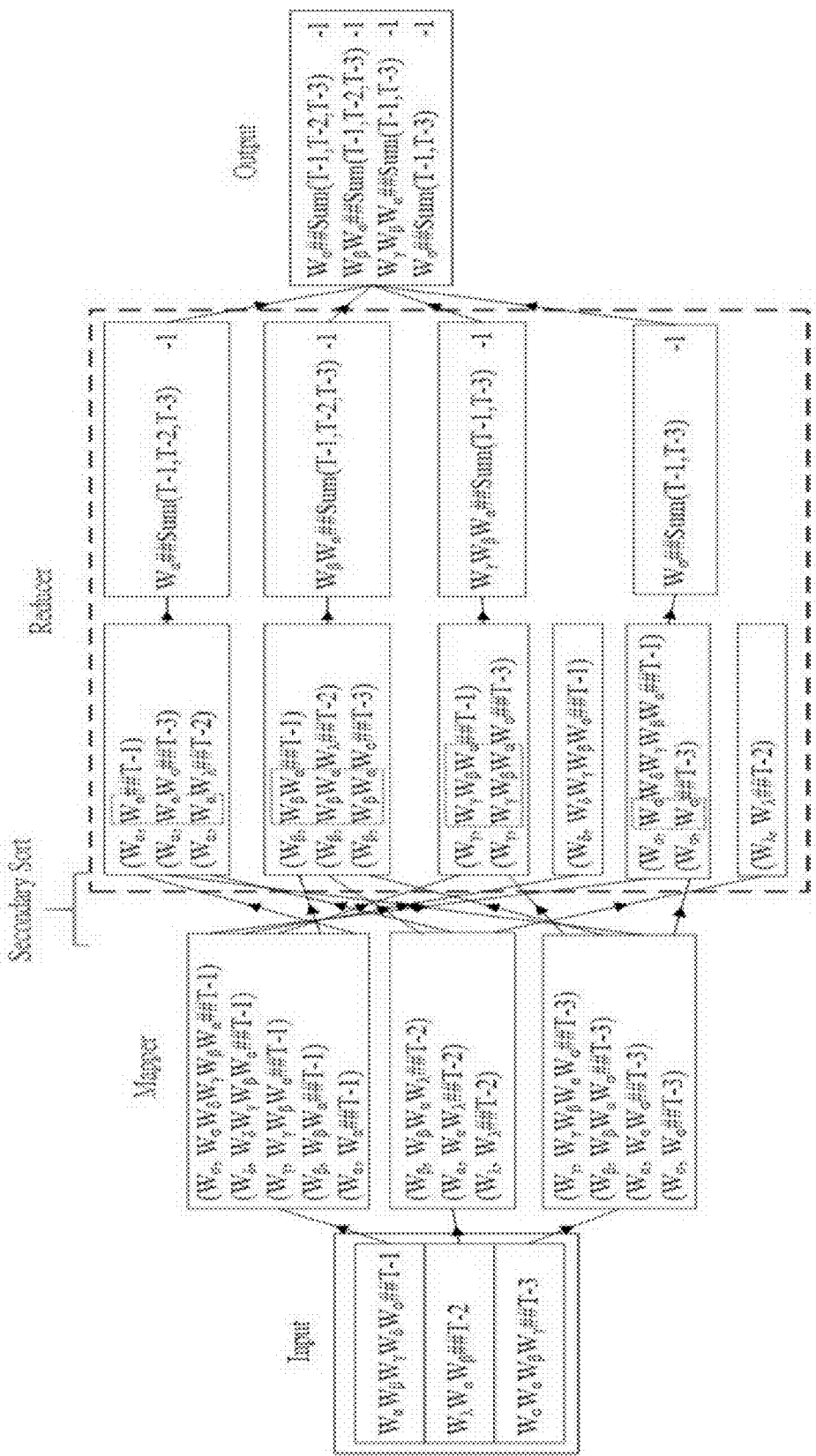
FIG. 8 is an example of MapReduce data flow for Left Boundary Verification of maximal repeat pattern in Pass One.
Figure 9:
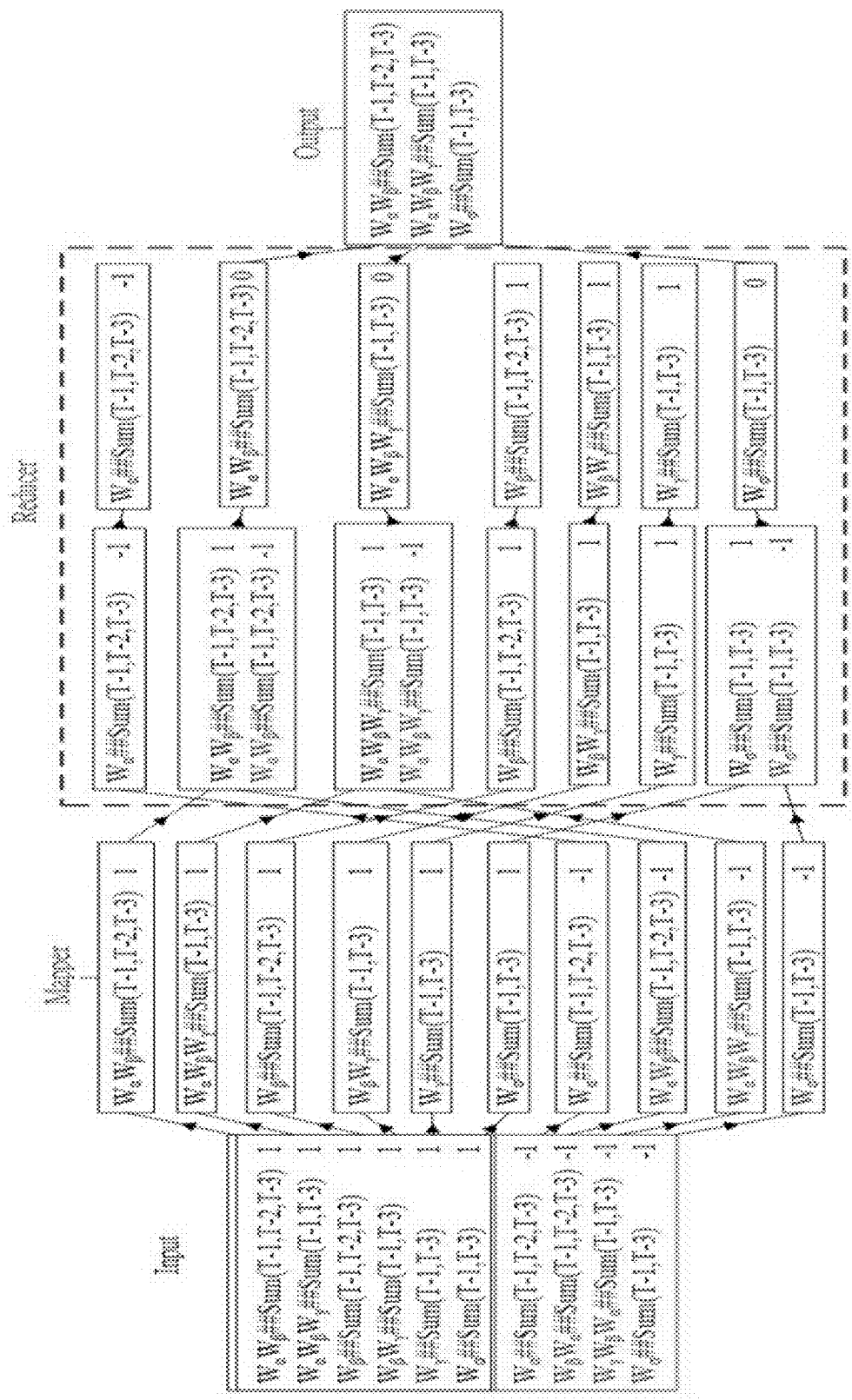
FIG. 9 is an example of MapReduce data flow for (Right and Left) Boundary Verification of maximal repeat pattern in Pass Two.

FIG. 7, FIG. 8 and FIG. 9 illustrate the details of the processes of extracting maximal repeat patterns from tagged sequences by having three sequences as the input, "$W_\alpha W_\beta W_\gamma W_\delta W_\rho$", "$W_\lambda W_\alpha W_\beta$" and "$W_\rho W_\alpha W_\beta W_\gamma$", which are tagged with "T-1", "T-2", and "T-3", respectively.

FIG. 7 and FIG. 8 illustrate the dataflow in "Pass One" for extracting candidate maximal repeat patterns with the right and left boundary verification, respectively. After generating the suffixes of all sequences, these suffixes are divided into several groups according to their prefix, for example, the first symbol "w". As shown in the "Secondary Sort" column within FIG. 7, the patterns with the dashed rectangle are candidate significant patterns with right boundary verification, these are: "$W_\alpha W_\beta$", "$W_\alpha W_\beta W_\gamma$", "$W_\beta$", "$W_\beta W_\gamma$", "$W_\gamma$" and "$W_\rho$". Similarly, as shown in FIG. 8, there are four candidate significant patterns with left boundary verification: "$W_\alpha$", "$W_\rho W_\alpha$", "$W_\gamma W_\beta W_\alpha$", and "$W_\rho$". Furthermore, the values of "1" or "−1" indicate the passing right or left boundary verification, respectively. Note that the repeated pattern "$W_\alpha$" in FIG. 7 is not generated as a candidate pattern with right boundary verification because "$W_\alpha$" is always followed by "$W_\beta$". Similarly, in FIG. 8, "$W_\beta$" and "$W_\gamma W_\beta$" are not candidate maximal repeat pattern with left boundary verification because they are always followed by "$W_\alpha$". This is, "$W_\alpha$" is the predecessor of "$W_\beta$" and "$W_\beta W_\gamma$" in the original sequences.

In FIG. 9, the map task reads the input that comprising two previous outputs of candidate maximal repeat patterns with left and right boundary verification in "Pass One". The map task uses the suffix tagged with "Sum (TagsList)" as the key and output to the reducer without modification if the value is "1", but output the reverses of the suffix if its value is "−1". As shown in FIG. 9, for example, the patterns "$W_\beta W_\alpha$" whose value is "−1" is converted to "$W_\alpha W_\rho$" and the output is written to the reducer as "$W_\alpha W_\beta$-1". It is easy to find that the summation will be equal to "0" when that pattern appears in the FIG. 7 (value=1) and its reverse can be found in FIG. 8 (value=−1). In FIG. 9, "$W_\alpha W_\rho$", "$W_\alpha W_\beta W_\gamma$" and "$W_\rho$" are outputted as maximal repeat patterns because the summation of their corresponding two values is equal to "0". On the contrary, for example, the "$W_\alpha$" is not maximal repeat pattern because it is always followed by the "$W_\beta$" such that it does not pass right boundary verification.

A simple example is presented below to show the processes of scanning the sorted suffixes one by one to extract candidate maximal repeat patterns and meanwhile computing the frequency distribution table of these patterns according to the tags derived from the sequences that comprise these patterns. To accumulate the frequency distribution of one candidate maximal repeat pattern while scanning sorted suffixes, a stack with push/pop operations is used.

FIG. 10 includes nine sorted suffixes attached with timestamps as tags; one extra line (the 10th line) with empty is added to force the remaining patterns in the "PatternStack" to be popped out. FIG. 11 presents the final frequency distribution table of four candidate significant patterns that are expected to be extracted. To understand the whole processes more precisely, the temporary contents of the "PatternStack" are presented below when scanning the nine sorted suffixes one by one in FIG. 10. The frequency distribution of one pattern comprises the list of values computed by the function "F" according the timestamps (tags) in this example.

Figure 12:
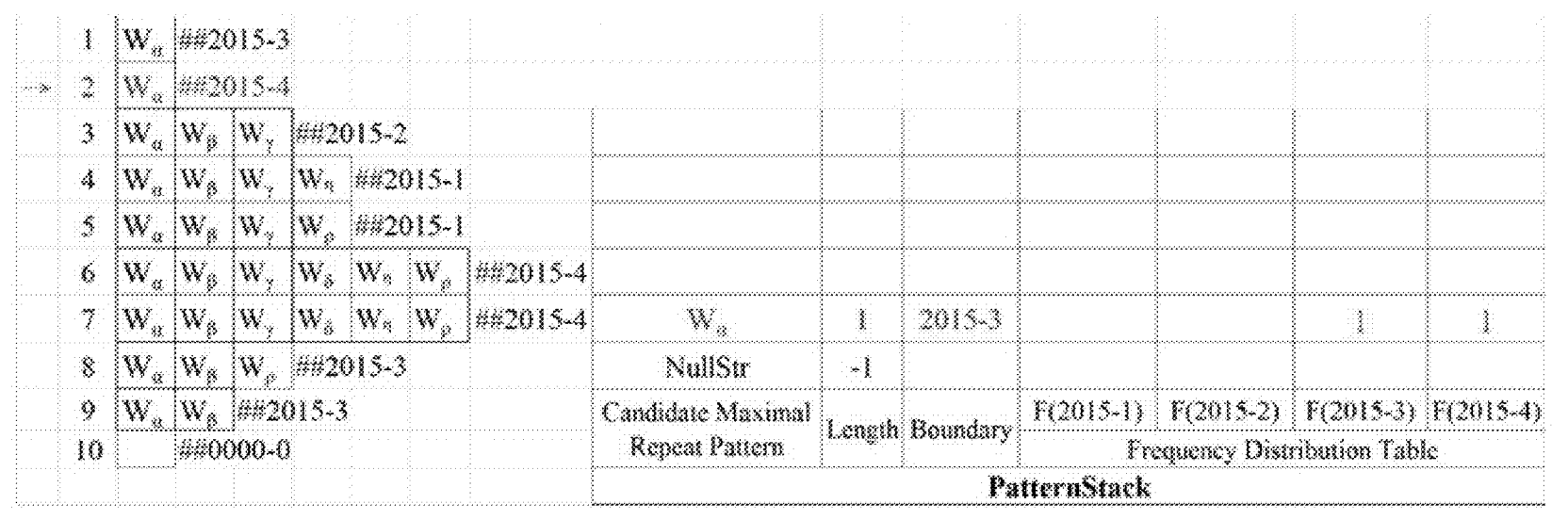
Figure 13:
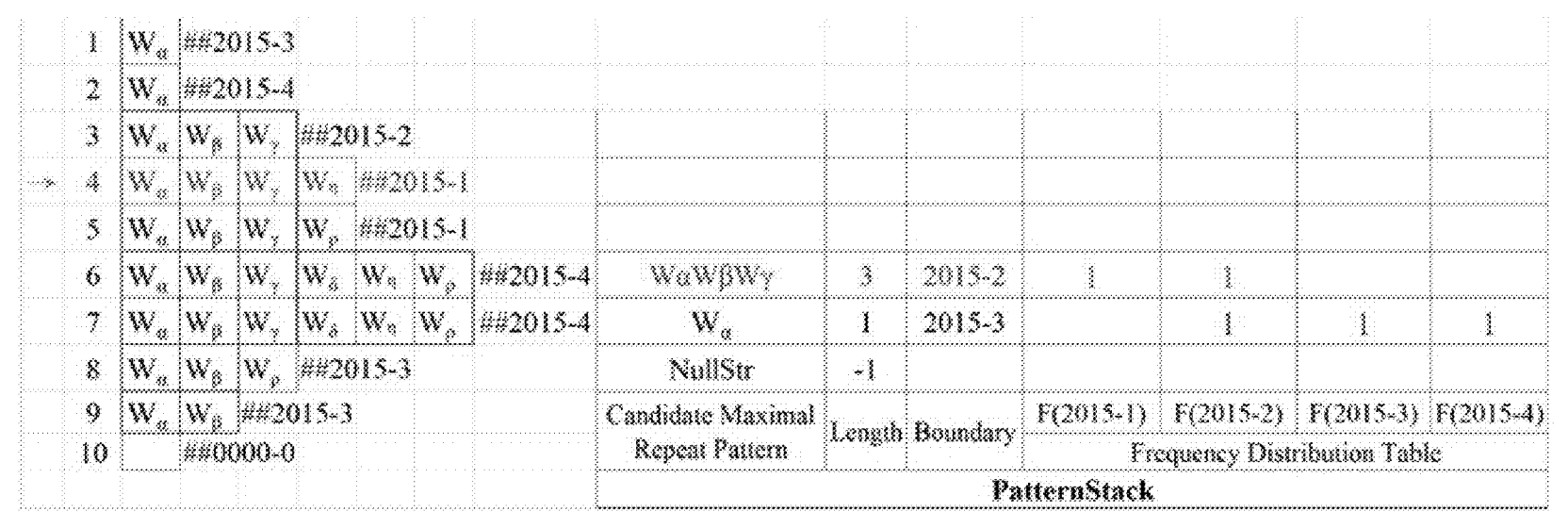
Figure 14:
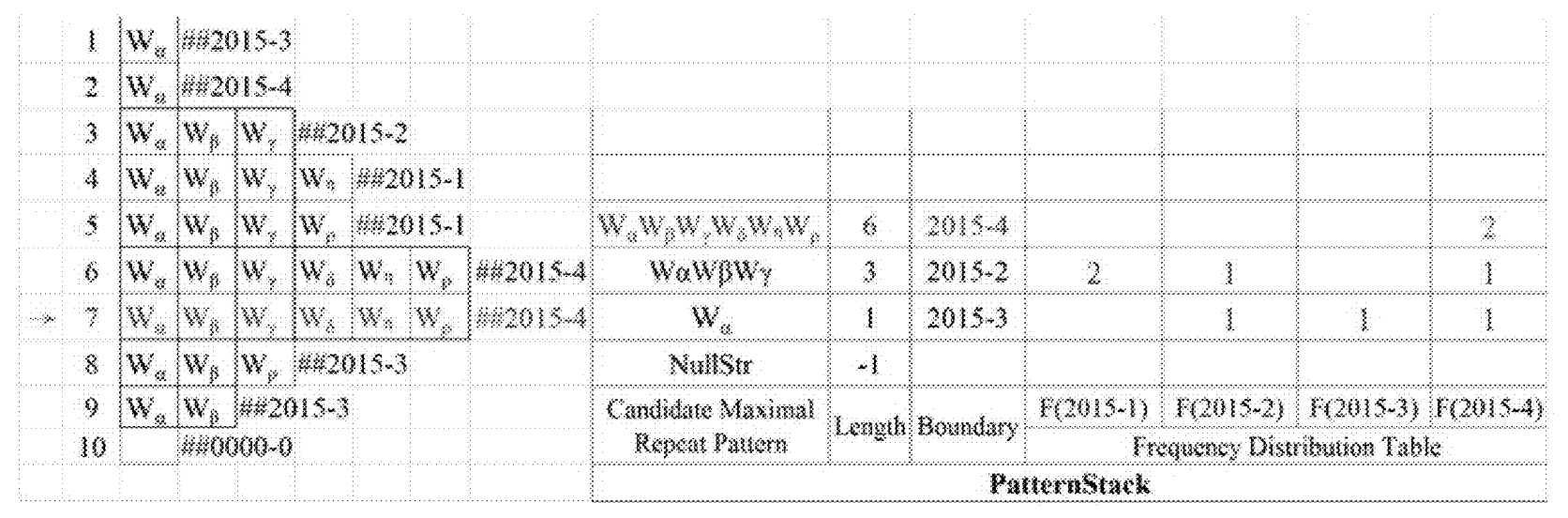
Figure 16:
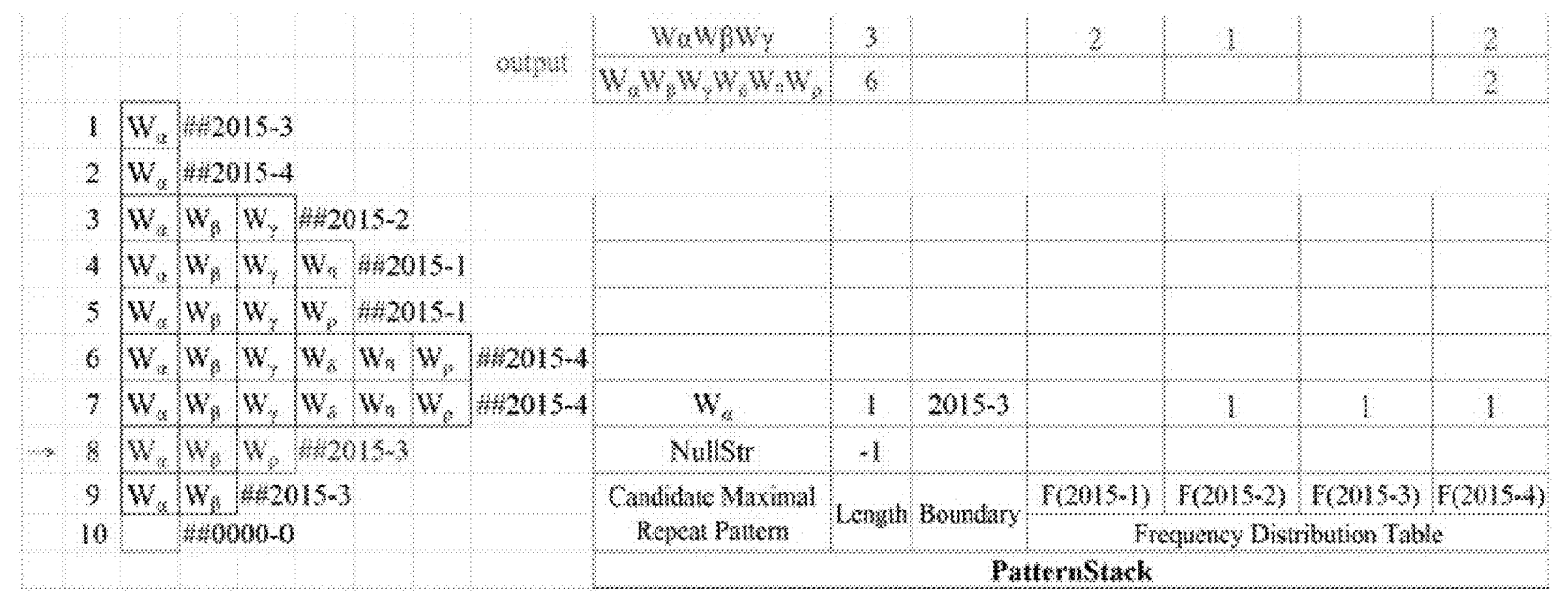
Figure 17:
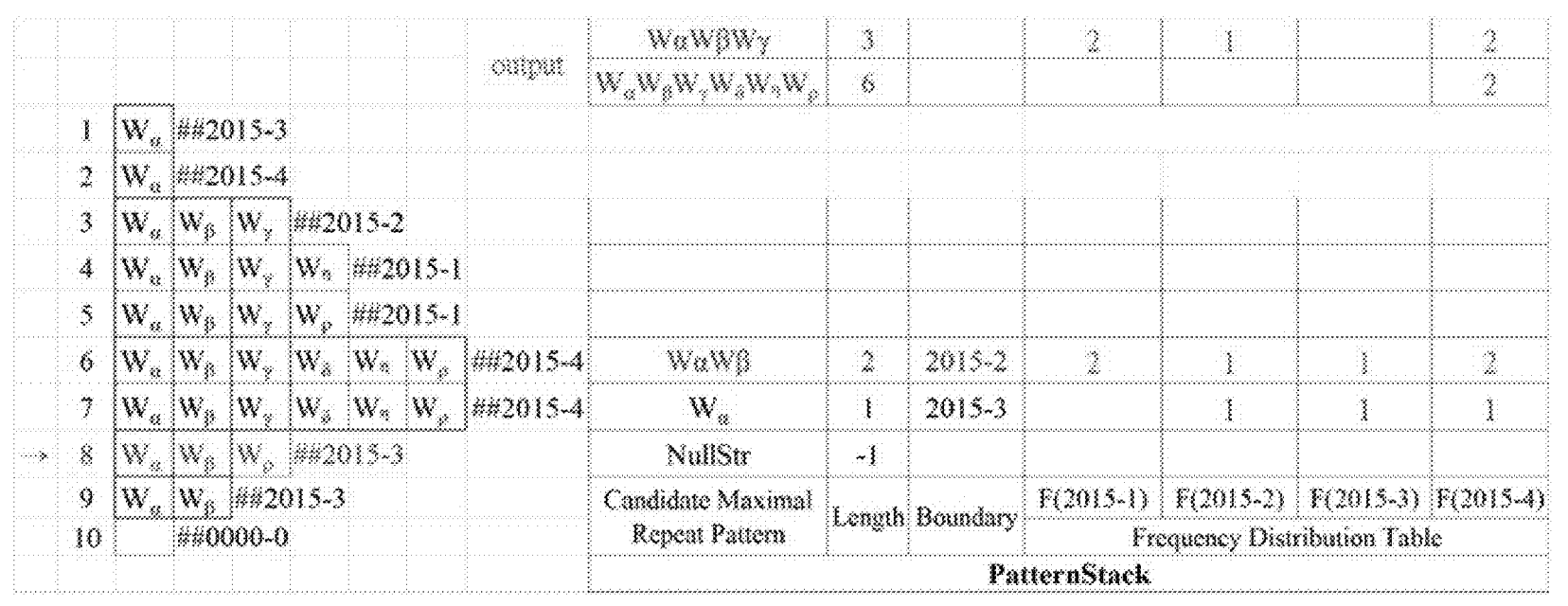
Figure 18:
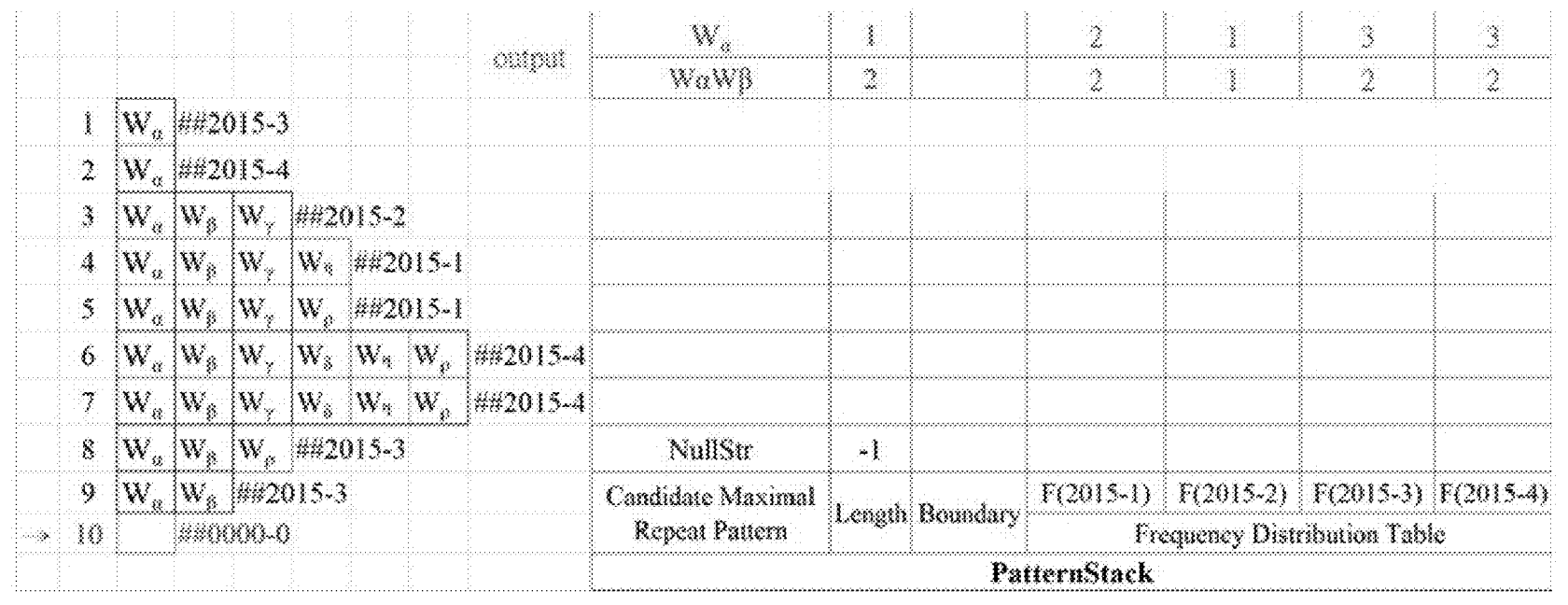

When scanning at line 2 in FIG. 12, the pattern "$W_\alpha$" is found as the longest common prefix of the first and the second lines. The pattern "$W_\alpha$" is pushed into the "PatternStack" because its length (=1) was greater than that (=−1) of the "NullStr" on the top of the "PatternStack". Similarly, as shown in FIG. 13 and FIG. 14, when scanning at lines 4 and 7 revealed two patterns, "$W_\alpha W_\beta W_\gamma$" and "$W_\alpha W_\beta W_\gamma W_\delta W_\eta W_\rho$", which are consecutively pushed into the "PatternStack". However, as shown in FIG. 15, Scanning at line 8 revealed that the length (=2) of pattern "$W_\alpha W_\beta$" is less than that (=6) of pattern "$W_\alpha W_\beta W_\gamma W_\delta W_\eta W_\rho$" on the top of the "PatternStack". This situation causes the "$W_\alpha W_\beta W_\gamma W_\delta W_\eta W_\rho$" and its frequency distribution popped out (FIG. 16). Furthermore, the frequency distribution of "$W_\alpha W_\beta W_\gamma W_\delta W_\eta W_\rho$" is accumulated to that of "$W_\alpha W_\beta W_\gamma$" because the latter is a sub-pattern of the "$W_\alpha W_\beta W_\gamma W_\delta W_\eta W_\rho$"; the frequency distribution of the "$W_\alpha W_\alpha W_\gamma$" on the top of the "PatternStack" needed to be adjusted according to the boundary "2015-4" because that the boundary is counted twice at line 6. Similarly, a second pop operation runs once again because the length (=2) of the "$W_\alpha W_\rho$" is still less than that (=3) of the "$W_\alpha W_\beta W_\gamma$" on the top of the "PatternStack". Then, output the "$W_\alpha W_\beta W_\gamma$" and its frequency distribution, which is accumulated to that of the "$W_\alpha W_\beta$", which is freshly generated, and then the "$W_\alpha W_\beta$" with its frequency distribution is pushed into the "PatternStack" (FIG. 17) after removing the boundary (2015-4) overlapping "$W_\alpha W_\beta$" at line 7. When line 10 is scanned as in FIG. 18, an extra line with empty string " " force the two patterns, "$W_\alpha$" and "$W_\alpha W_\beta$", and their frequency distributions to be popped from the "PatternStack". After scanning all of 9 sorted suffixes in FIG. 10, there are four candidate maximal repeat patterns, "$W_\alpha$", "$W_\alpha W_\beta$", "$W_\alpha W_\beta W_\gamma$" and "$W_\alpha W_\beta W_\gamma W_\delta W_\eta W_\rho$". As shown in FIG. 11, for example, the "$W_\alpha W_\beta W_\gamma W_\delta W_\eta W_\rho$" can be esteemed as one class marker because it just appears in the "F(2015-4)".

Figure 24:
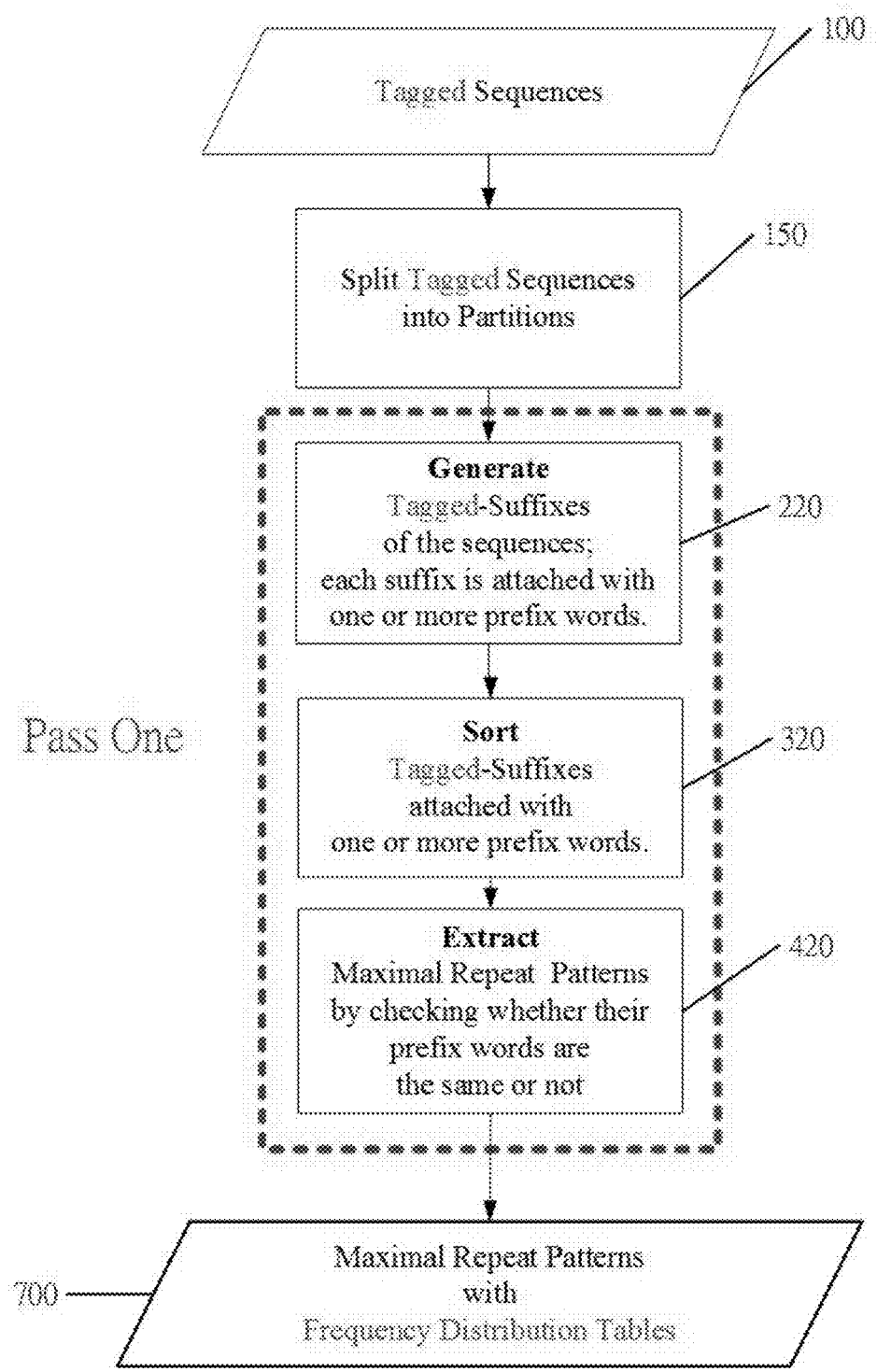
FIG. 24 shows the conceptual diagram of how to apply this invention to applications containing sequential data with tags.
Figure 29:
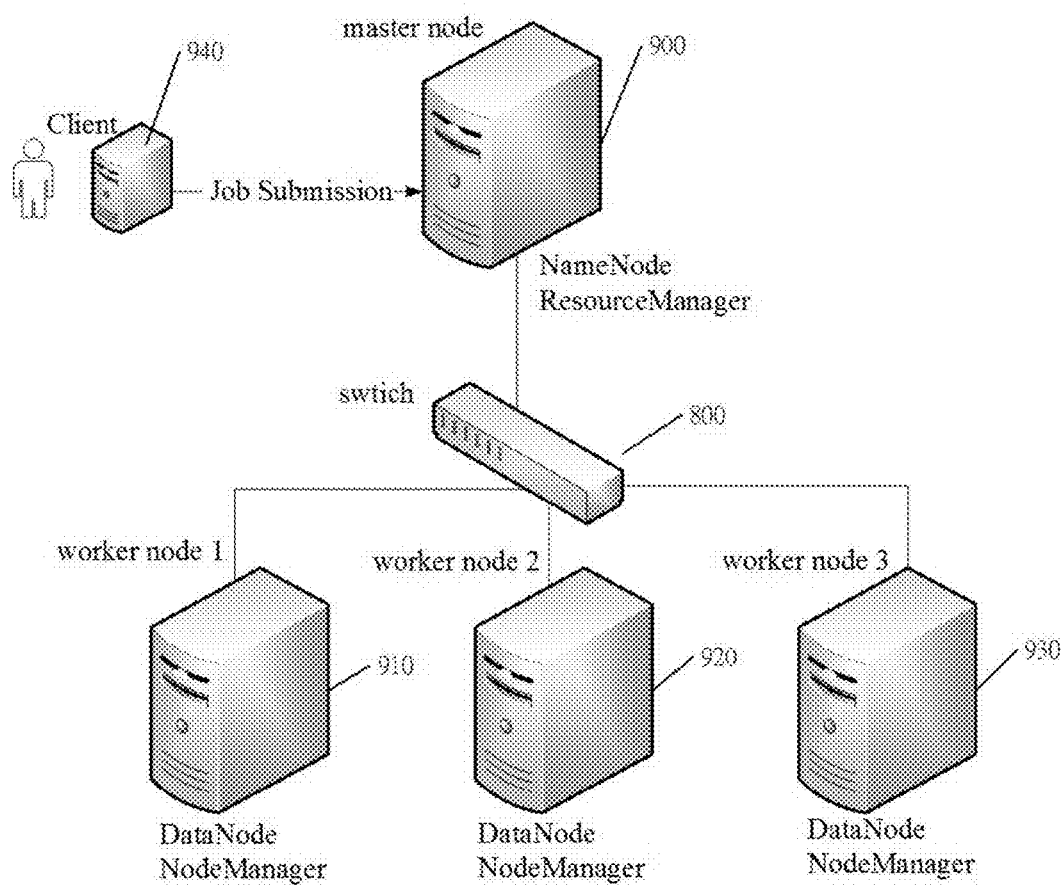
FIG. 29 gives an example of a computing system (a cluster of four machines consisting of one master node and three worker nodes) for performing this invent via the MapReduce framework.
Figure 30:
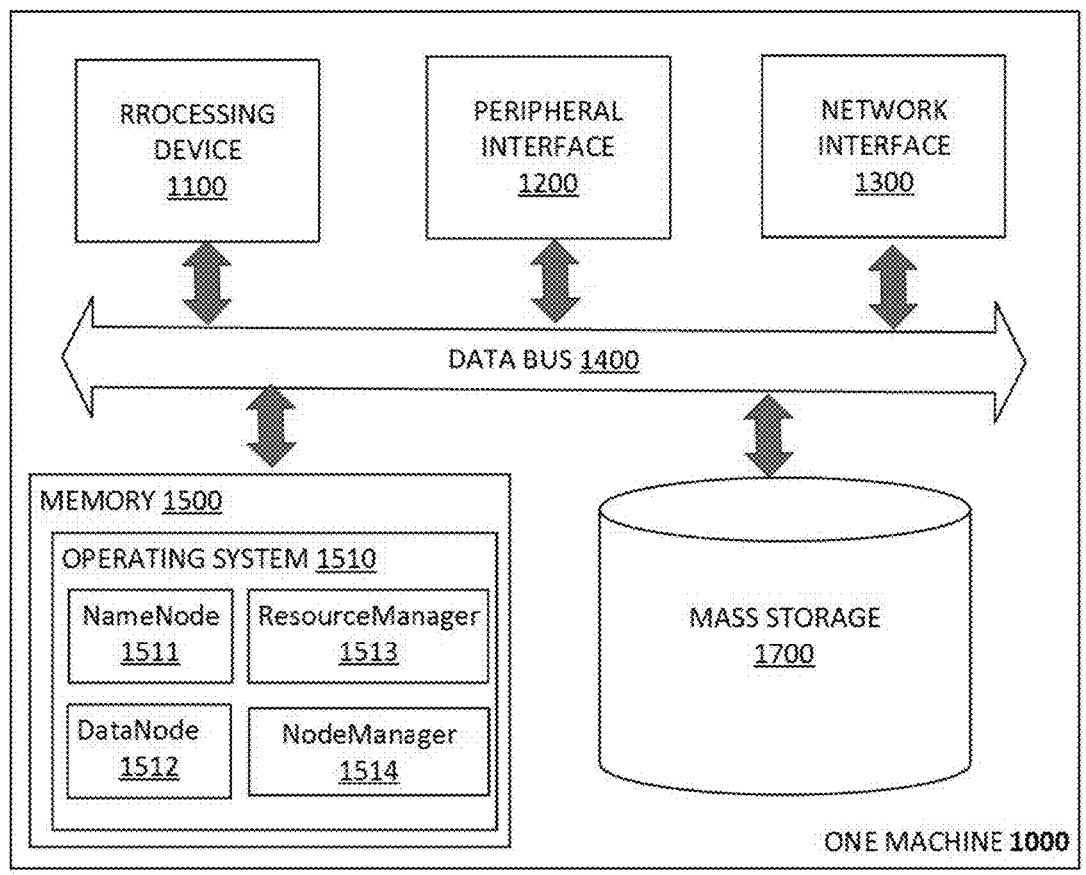
FIG. 30 shows a hardware diagram of one of four machines mentioned in FIG. 29 in accordance with various embodiments of the present disclosure.

The computation of maximal repeat patterns can be improved by using only one pass, as show in FIG. 24, instead of using two passes. In step 220, when generating tagged-suffixes, each suffix is not only attached with a tag but also with one or more prefix words just ahead of that suffix. For example, as shown in FIG. 21, the $2^{nd}$ suffix "$W_{(p,2)}W_{(p,3)} \ldots W_{(p,4)} W_{(p,m)}$" is attached not only with a tag "T-p" but also with the prefix word "$W_{(p,i)}$". After sorting the suffixes in step 320 and having boundary verification that scans the sorted suffixes in step 420, for example as shown in FIG. 22, the three patterns, "$W_\alpha$", "$W_\alpha W_\beta$", "$W_\alpha W_\beta W_\gamma$", are set as "TRUE" and output as maximal repeat patterns 700, as shown in FIG. 23, because their prefix words containing different words as "$W_\epsilon$", "$W_\tau$" and "$W_\pi$"; the "$W_\alpha W_\beta W_\gamma W_\delta W_\eta W_\rho$" is set as "FALSE" and esteemed not a maximal repeat pattern because the prefix words of suffixes in line 6 and line 7 within FIG. 22 are the same as word "$W_\pi$". The PrefixWord Distribution can be obtained by accumulating the frequency of prefix words while scanning the sorted suffixes as the processes for computing frequency distribution described from FIG. 12 to FIG. 18, where the "$W_\epsilon(5)$", for example, in the PrefixWord Distribution of the "$W_\alpha$", as shown in FIG. 23, means that the word "$W_\epsilon$" appears five times just ahead of the "$W_\alpha$" in the sequences, as shown in FIG. 22. The computing system may be implemented across multiple nodes of a cluster of four machines, for example, as described in FIG. 29. One of four machines is configured as master node and name node 900. The other three machines are configured as worker nodes and data nodes (910, 920 and 930). These four machines (nodes) are connected via a switch 800, e.g. 1 GbE (1 Gigabit) switch or 10 GbE (10 Gigabit) switch, for message communication or data exchange among machines. After the user client 940 uploads the input of sequences with tags, first of all, the input is split into fixed-size blocks (partitions), e.g. 128 Megabyte (MB) per block, and distributed these blocks evenly among data nodes and the name node 900 keep the directory that records the physical locations of every block. After the client 940 uploading the input to data nodes, the user client 940 can submit a job to the master node 900, the master node with the process "ResourceManager" dispatches the map or reduce tasks to worker nodes with the process "NodeManager". The mass storage system for storing the input consists of one name node and three data nodes, for example, where the name node (master) keeps the locations of the blocks (partitions) of input files, and the blocks are stored in data nodes (worker nodes) while taking consideration of blocks distribution among these nodes for load-balancing and the replicas of every block (partition) for fault-tolerance. FIG. 30 shows a schematic diagram of one machine 1000, for example, within a cluster of four machines as described in FIG. 29. The machine 1000 comprises a processing device 1100, a peripheral interface 1200, a network interface 1300, memory 1500 and mass storage 1700, wherein each of these devices are connected across a local data bus 1400. The processing device 1100 may include a variety custom made or commercially available processor, a central processing unit (CPU) or an auxiliary processor among several processors. The memory 1500 can include any one of a combination of volatile memory elements, e.g. random-access memory (RAM, such as DRAM, and SRAM, etc.). The memory 1500 typically includes a native operating system 1510 and may include some or all of applications as NameNode 1151, Datallode 1512, ResourceManager 1513 and NodeManager 1514. The network interface 1300 is used to transmit and/or receive data over a network environment. The peripheral interface 1200 may have the mass storage 1700, e.g. hard disk (HD) or solid-state disk (SSD), achieve high throughput of data transfer. To speed up the whole computation, the blocks (partitions) may be stored in the memory 1500 in worker nodes when performing map and reduce tasks, instead of being stored in the mass storage 1700 if the capacity of the memory 1500 in worker nodes is capable to support the whole computation.

Figure 19:
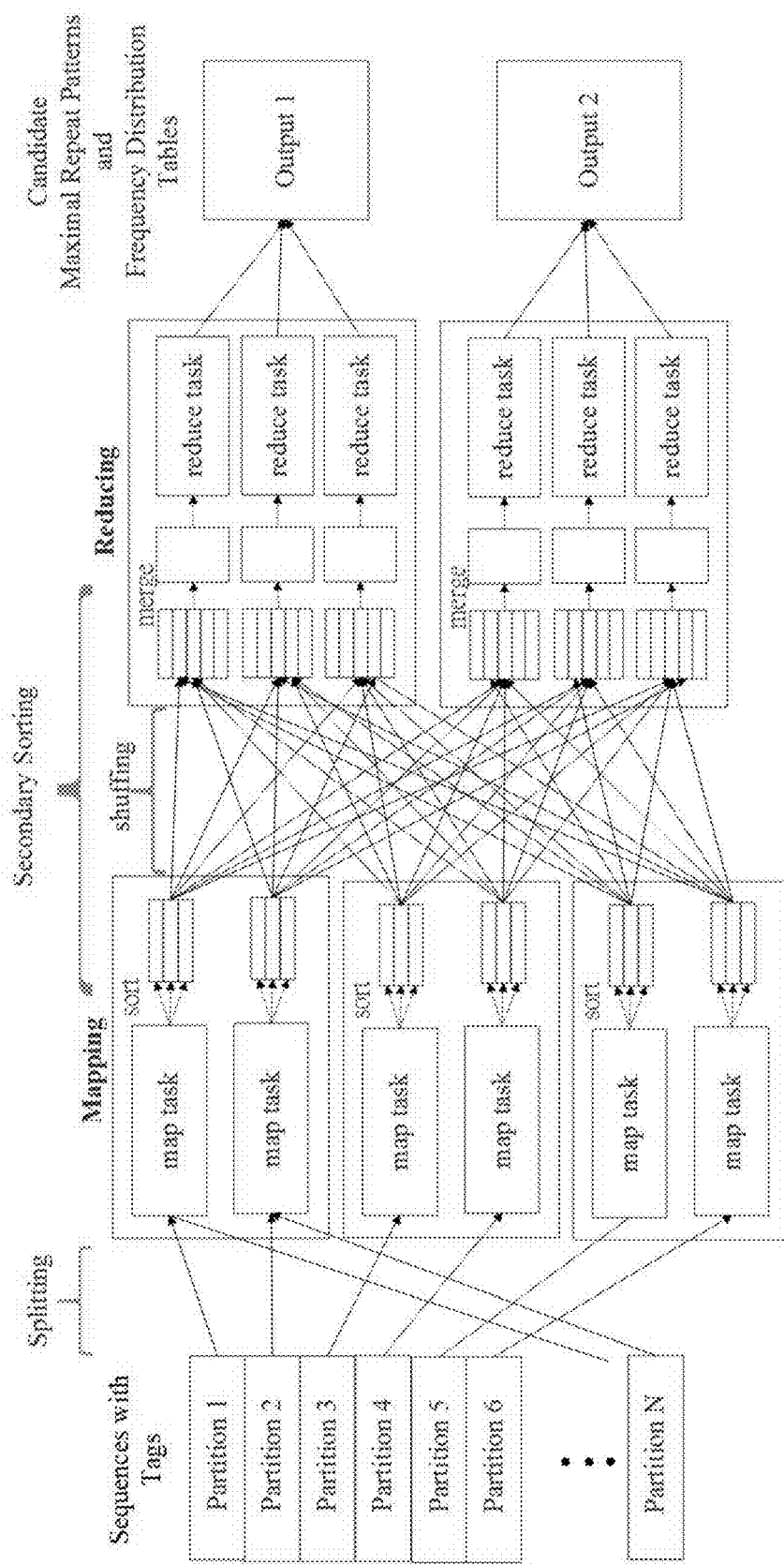
FIG. 19 gives the conceptual diagram of hardware components for executing the "Pass one" in FIG. 1.

To further specify the requirements for hardware components to preform computation of this invent based on the MapReduce platform within a cluster of machines, for example as shown in FIG. 19, the input of sequences with tags should be split into N fixed-size partitions (blocks) and distributed these partitions to the map tasks that run within worker nodes, e.g. two map tasks per worker node as shown in FIG. 19, for executing map tasks. After finishing map tasks, the temporary results in the format <"key pair", Null>, where "key pair" consists of "key" and "value", are send to the reduce tasks that run within worker nodes, e.g. three reduce tasks per worker node as shown in FIG. 19, The purpose (secondary sorting) of using "key pair" is to have the values with the same key also sorted when the output of one key is sent to one of reduce tasks. The processes of secondary sorting include "sort" partial values for each of keys in map tasks, and then "shuffling" exchanges partial sorted values across all of reduce tasks and finally "merge" all of partial sorted values received from all of map tasks. The assignments of these temporary results (sorted suffixes with tags-list) to reduce tasks are based on the distribution of the values of the "key" and determined by the system automatically. The output of reduce tasks is specified as "Output 1" and "Output 2", for example as shown in FIG. 19. Note that the initial input (sequences with tags in partitions) of the map tasks and the final output ("Output 1" and "Output 2") of the reduce tasks can also be stored in memory to speed up the computation if possible.

The conceptual diagram of applying applications based on this invention is shown in FIG. 20. FIG. 20(a) shows that there are 11 instances, for example, of sequential data and each is labeled with a specific tag (small icon) by domain experts or users. This invention can extract maximal repeat patterns, e.g. the five patterns with rectangles, as shown in FIG. 20(b), and meanwhile compute the class frequency distribution of these patterns, as shown in FIG. 20(c), where the classes (large icon) are derived from the tags according to what kind of features frequency comparison one desire to inspect.

Due to the existence of many combinations of sequences and tags, there are potential applications in many fields. On the other hand, this invention is expected to be capable to handle a huge amount of tagged sequential data because it bases on MapReduce framework. It is a big challenge in bioinformatics for biologists or domain experts, for example, to trace (or identify) the path (or relationship) between "genotype" and "phenotype". However, this invention may provide valuable clues to identify the biomarkers (genotypes) by comparing the class frequency distributions of maximal repeat patterns extracted from those genomic sequences attached with distinct classes (tags), where the classes are given by biologists or domain experts according to the existence of features (phenotypes). Therefore, it is attractive for biologists to have further experiments with the patterns, for example, that just appear in one unique class. This invention can extract very long repeats from a huge amount of genome sequences with tags, and furthermore reduce sharply the number of candidate genomic patterns for further verification or experiments in wet laboratory according to class frequency distributions of patterns extracted, where the classes are derived from the tags specified by domain experts.

To further illustrate that this invent may provide clues to biologists when they try to identify or construct the relationship of "genotype" and "phenotype", there are four figures, FIG. 25, FIG. 26, FIG. 27 and FIG. 28. First of all, as shown in FIG. 25 for simplicity, there are 20 DNA sequences, named with Gene-Identifier (GI) in NCBI whose lengths are 50 bp and derived from 20 DNA sequences within four human genome files, "hs_ref_GRCh38.p7_chr1.fa", "hs_ref_GRCh38.p7_chr10.fa", "hs_ref_GRCh38.p7_chr11.fa" and "hs_ref_GRCh38.p7_chr12.fa". These four genome files are downloaded from NCBI FTP site as "ftp://ftp.ncbi.nih.gov/genomes/H_sapiens/" (Modification Date: 2016/6/13).

To each of 20 DNA sequences in FIG. 25, as shown in FIG. 26, each of 20 organisms is given one "ClassID" that represents one of distinctive features ("phenotype"), e.g. "C1" for the $1^{st}$ organism. To emphasize the existence of connection between "genotype" and "phenotype" such that all of organisms who have one of same features ("phenotype") also contain same genomic patterns "genotype", for simplicity, the hypothesis markers ("genotype") are inserted into the corresponding DNA sequences whose "ClassID" are the same.

FIG. 27, for example, shows the input format for the computation of maximal repeat extraction proposed in this invent, where one of hypothesis markers is inserted manually but without purpose in the 50 bp DNA sequences in FIG. 25 according to the mapping in FIG. 26. FIG. 28 gives the table computed by this invent that contains the statistics of 48 maximal repeat patterns whose lengths are greater than 12 for simplicity. It can be observed that four patterns, the $1^{st}$, $3^{rd}$, $7^{th}$ and $42^{th}$, just appear in one of four classes, e.g. the $1^{st}$ "AAAACCCCGGGGTTTT", and meanwhile appear in all of the instances in that class, e.g. the $1^{st}$ just in "C4". That means the pattern "AAAACCCCGGGGTTTT" reveals strong connection with the common feature "C4" observed and specified by domain experts as described in FIG. 27. Note that the $41^{th}$ can be omitted because the $41^{th}$ is a substring of the $42^{th}$, and it is believed that the longer DNA sequences contain more specific information than the shorter ones do in bioinformatics.

Based on similar techniques and scenarios as described above, this invention is expected to provide valuable hints for the other sequential data mining applications, for example, trend analysis in text mining that the ones have texts attached with timestamps as tags and then observe the frequency distribution of the patterns over equally spaced time intervals to predict the trend web events (logs) analysis in internet security that the ones collect the time series of events attached with internet address (IPs) as tags and then may detect the regularity of some hacker actions; behavior analysis that the ones use the sequential actions labeled with types (classes) as tags by observers (or researcher) and then may identify some distinctive habits (actions) just happened in specific classes; production line analysis that the ones collect the values sensed or materials used in each step when the factories generate the products as their traceability. Once some products are identified their defects by the quality control department, or are out of order after being sold and used for a time period, the companies may benefit from their rapid response by inspecting the suspected patterns that are found mostly in the traceability of failed products but seldom happened in that of normal products.

What is claimed is:

1. A method for extracting maximal repeat patterns and computing frequency distribution tables, executed in a computing system across a plurality of computing nodes each selected from a master node, a map task worker node and a reduce task worker node, wherein the master node is used for assigning tasks to the map task worker nodes and the reduce task worker nodes for execution, the maximal repeat patterns are extracted from sequences attached with tags, and the frequency distribution tables of candidate patterns are computed according to classes or categories derived from the tags, the method comprising the following steps:

inputting, into the computing system, a plurality of sequences each attached with at least one pre-specified tag, wherein the tag comprises at least one of: timestamps, classes and categories;

splitting, by the computing system, the plurality of sequences into a plurality of partitions;

assigning, by the master node, the partitions to the plurality of map task worker nodes;

generating, by the map task worker nodes, suffixes of the sequences in the same partition according to the map task assigned by the master nodes, wherein each of the suffixes is attached with the tag belonging to a corresponding sequence;

dividing, by the map task worker nodes, the suffixes into groups, wherein each of the groups contains the suffixes whose first k components are the same;

sorting, by the map task worker nodes, the suffixes within each of the groups into sorted suffixes;

assigning, by the master node, all of the sorted suffixes whose first k components are the same to the plurality of reduce task worker nodes, respectively;

scanning, by the reduce task worker nodes, the sorted suffixes whose first k components are the same to extract a longest common prefix of two successive suffixes as one candidate maximal repeat pattern for each of the reduce tasks; and computing, by the reduce task worker nodes, a frequency distribution of the candidate maximal repeat pattern according to the classes or categories derived from the tags.

2. The method of claim 1, wherein each of the sequences is a sequential data, and the sequential data comprises at least one of: characters, words and records.

3. The method of claim 1, wherein the candidate maximal repeat pattern is with right boundary verification if it is extracted from the original sequences; while the candidate maximal repeat pattern is with left boundary verification if it is extracted from the reverse of the sequences.

4. The method of claim 1, wherein a maximal repeat pattern is a repeat pattern with right boundary verification and the reverse of the maximal repeat pattern is with left boundary verification.

5. The method of claim 4, wherein the right and left boundary verification of one maximal repeat pattern can be done simultaneously, if each of suffixes is attached with one or more front components just ahead of that suffix in the original sequence of that suffix.

6. The method of claim 1, wherein the step of sorting the suffixes within one group includes sorting the suffixes with the same key collected from all of the partitions.

7. The method of claim 1, wherein the reducer executes the step of scanning the sorted suffixes, extracting the candidate maximal repeat patterns, and computing the frequency distributions.

8. The method of claim 1, wherein the process of generating suffixes of the sequences is modified as the process of generating the p front components of suffixes of the sequences; the maximal length of candidate maximal repeat patterns extracted is limited to p.

* * * * *